United States Patent
Vinci et al.

(10) Patent No.: US 12,307,046 B1
(45) Date of Patent: May 20, 2025

(54) POSITION SENSOR

(71) Applicant: Apple Inc., Cupertino, CA (US)

(72) Inventors: Samuel E. Vinci, San Francisco, CA (US); Arjun N. Venkatesh, San Francisco, CA (US); Bradford J. Zercoe, San Jose, CA (US); Aaron W. Julin, Albany, CA (US); Athena Y. Huang, Palo Alto, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 18/499,949

(22) Filed: Nov. 1, 2023

Related U.S. Application Data (60) Provisional application No. 63/385,578, filed on Nov. 30, 2022.

(51) Int. Cl.
  *G06F 3/041* (2006.01)
  *G06F 3/023* (2006.01)
  *G06F 3/044* (2006.01)

(52) U.S. Cl.
  CPC ............ *G06F 3/0418* (2013.01); *G06F 3/023* (2013.01); *G06F 3/044* (2013.01)

(58) Field of Classification Search
  CPC combination set(s) only.
  See application file for complete search history.

(56) References Cited

U.S. PATENT DOCUMENTS

| | | | | |
|---|---|---|---|---|
| 2006/0121933 A1* | 6/2006 | Ikeda | .................... | H04N 7/142 455/90.3 |
| 2012/0207438 A1* | 8/2012 | Yu | ............................ | G02B 6/43 385/101 |
| 2013/0270399 A1* | 10/2013 | Berkowitz | ........... | B25J 19/0029 248/65 |
| 2016/0116748 A1* | 4/2016 | Carollo | ................ | H04N 13/286 359/632 |
| 2019/0195664 A1* | 6/2019 | Morrison | ............. | G09G 3/2092 |
| 2019/0292827 A1* | 9/2019 | Aagaard | ............. | H04M 1/0268 |
| 2020/0350990 A1* | 11/2020 | Beattie, Jr. | ......... | H04B 10/2513 |

* cited by examiner

*Primary Examiner* — William Boddie
*Assistant Examiner* — Alecia D English
(74) *Attorney, Agent, or Firm* — Dorsey & Whitney LLP (57) ABSTRACT

An electronic device includes a first portion, a joint, a second portion adjustably connected to the first portion at the joint, a cable extending from the first portion to the second portion through the joint, and a processor electrically connected to the cable and a memory component storing electronic instructions that, when executed by the processor, configure to the electronic device to transmit data through the cable, the data having a bit error rate, and determine a position of the first portion relative to the second portion based on the bit error rate.

18 Claims, 8 Drawing Sheets

POSITION SENSOR

CROSS-REFERENCE TO RELATED APPLICATION(S)

This claims priority to U.S. Provisional Patent Application No. 63/385,578, filed 30 Nov. 2022, and entitled "Position Sensor," the entire disclosure of which is hereby incorporated by reference.

FIELD

The described embodiments relate generally to position sensing. More particularly, the present embodiments relate to position sensors for electronic devices including communication cables.

BACKGROUND

Recent advances in computing have enabled electronic devices to become more and more compact and portable. Consumers drive demand for smaller devices with increased functionality. In some devices, multiple portions of the device can be moved or articulated relative to one another. It can be advantageous to detect or measure the position of each portion of a device using position sensors. However, position sensors take up space and must be accommodated within the smaller volumes of compact electronic devices.

SUMMARY

In at least one example of the present disclosure, an electronic device includes a first portion, a joint, a second portion adjustably connected to the first portion at the joint, a cable extending from the first portion to the second portion through the joint, and a processor electrically connected to the cable and a memory component storing electronic instructions that, when executed by the processor, configure to the electronic device to transmit data through the cable, the data having a bit error rate, and determine a position of the first portion relative to the second portion based on the bit error rate.

In one example, the first portion includes a display, the second portion includes an input mechanism, and the cable is configured to transmit data from the input mechanism to the display. In one example, the display is positioned at an angle relative to the input mechanism and the electronic instructions, when executed by the processor, configure the electronic device to detect a magnitude of the angle based on the bit error rate. In one example, the input mechanism includes a keyboard or a touchpad. In one example, the cable includes a flat flexible cable. In one example, the cable includes a clock spring. In one example, the cable includes a first arm and a second arm connected to the first arm at a bend portion.

In at least one example of the present disclosure, a position sensor includes a data transfer cable having a first portion and a second portion variably positioned adjacent the first portion, and a processor electrically connected to the data transfer cable and a memory storing electronic instructions that, when executed by the processor, cause the processor to transfer data through the data transfer cable and determine a position of the first portion relative to the second portion based on a bit error rate of the data.

In one example, the first portion is electrically unshielded from the second portion. In one example, the data transfer cable includes a clock spring. In one example, a first coil of the clock spring includes the first portion and a second coil of the clock spring adjacent the first coil includes the second portion. In one example, a distance between the first portion and the second portion is configured to vary. In one example, the data transfer cable includes a sliding contact having the first portion connected to the second portion at a bend, the first portion extends from the bend at a first length, and the second portion extends from the bend at a second length. In one example, the first portion is positioned relative to the second portion to define an overlap length equal to a shorter length of the first length and the second length. In one example, the first length and the second length are configured to be altered to vary a position of the second portion relative to the first portion.

In at least one example of the present disclosure, a position sensor includes an electrically conductive data transfer cable including a first portion, a second portion connected to the first portion, and a variable shield disposed between the first portion and the second portion. The variable shield electrically shields the first portion from the second portion to a first degree when the first portion is in a first position relative to the second portion and the variable shield electrically shields the first portion from the second portion to a second degree different than the first degree when the first portion is in a second position relative to the second portion.

In one example, the position sensor further includes a processor electrically connected to the data transfer cable and a memory storing electronic instructions that, when executed by the processor, cause the processor to send data through the data transfer cable, the data having a bit error rate, and determine if the first portion is in the first position or the second position relative to the second portion based on the bit error rate. In one example, the first degree and the second degree of electrical shielding affects the bit error rate. In one example, the data transfer cable includes a clock spring including a first coil including the first portion and a second coil including the second portion adjacent the first portion. In one example, the variable shield includes intermittent gaps exposing the first portion or the second portion.

BRIEF DESCRIPTION OF THE DRAWINGS

The disclosure will be readily understood by the following detailed description in conjunction with the accompanying drawings. In the drawings, like reference numerals designate like structural elements, and in which.

DETAILED DESCRIPTION

The following details representative embodiments illustrated in the accompanying drawings. The following descriptions are not intended to limit the examples to one or more preferred embodiments. Instead, the following descriptions are intended to cover alternatives, modifications, and equivalents as can be included within the spirit and scope of the described embodiments, as defined by the appended claims.

The following disclosure relates generally to position sensing. More particularly, the present embodiments relate to position sensors for electronic devices including communication cables. In at least one example, an electronic device can include a first portion, a second portion, and a joint. The second portion can be adjustable connected to the first portion at the joint. The electronic device can also include a cable extending from the first portion to the second portion through the joint. The position sensor described herein can be incorporated into any number of movable, adjustable electronic devices having articulable parts to detect relative positions thereof. These devices can include personal electronic devices such as laptop computers, phones, and virtual reality device. These devices can also include personal and industrial robots having one or more articulating limbs or other portions, including self-articulating robots having actuators to move various portions or limbs relative to one another. In each case, control algorithms and other functionalities can depend on sensing the positions and movements of these articulating parts relative to one another.

In at least one example, the cable can be a data transfer cable formed of electrically conductive material and configured to transfer electronic signals. In at least one example, the electronic device can also include one or more processors electrically connected to the cable and to a memory component storing electronic instructions that, when executed by the processor, cause the electronic device to transmit data through the cable, the data having a bit error rate (BER), and determine a position of the first portion relative to the second portion based on the BER.

It can be important to measure or detect the relative position of multiple portions of an electronic device during use for enhanced functionality. For example, a laptop computer can include a three-dimensional tracking system for facial recognition or input device tracking relative to a display screen. However, if the display screen is adjustable relative to other portions of the laptop computer, such as relative to a keyboard or base portion, the tracking system must know what the angle of the screen is to accurately detect objects in three-dimensions. Other devices can include adjustable parts or portions where the relative positions of one part compared to another may indicate a sleeping mode vs. a fully operational mode. There are many other reasons to detect the position of one portion of an electronic device relative to another for enhanced functionality.

In the examples disclosed herein, one or more communication cables configured to transfer data from one portion of a device to another, for example from an input keyboard or touchpad to a display screen, can be used to measure or detect the angle of the display screen relative to the input component when the display screen can be moved and adjusted by the user. The communication cable can be used to detect position without the need for additional position sensors or data paths required beyond the communication cable already used for transferring data between portions of the device.

For instance, the communication cable noted in the example above can be configured to be moved or altered in shape as part of a joint adjustably connecting two or more portions of an electronic device to affect the parasitic capacitance and self-inductance of the communication cable. As the parasitic capacitance and self-inductance of the communication cable is varied the parasitic coupling and self-interference is likewise varied, resulting in a varying BER of data transmitted through the cable. The higher the self-interference, the higher the BER of the data transmitted through the clock spring cable may tend to be. BER can be measured or determined by a processor by comparing data received at one end of the communication cable (or by a component connected to one end of the cable and configured to receive the data) to data sent by the processor (or by a transmitter connected to the processor). If a percentage sent data sent is corrupted or lost through the cable such that less un-corrupted data is received than was sent, this is indicative of the BER. The processor can execute software protocols to gather this information regarding sent vs. received data to determine the BER of the data across the cable.

This BER can be measured and directly correlated to a position of the cable, and thus the position of the joint through which the cable runs, and thus the position of one portion of an electronic device relative to another adjustably connected at the joint. Portions of electronic devices that are "adjustably connected" can include any part of the device designed to be moved relative to one another. Adjustable connections can include passive mechanical joints that need to be moved or adjusted proactively by a user. Adjustable connections can also include actuators and motors for automatic or assisted adjustability.

In at least one example, a memory component can be connected to a processor connected to the data transfer/communication cable. The memory component can include RAM components, ROM components, SRAM components, PROM components, magnetic storage memory, solid-state drives, or other types of memory and memory components. The memory component can include electronic instructions for the processor to execute a software protocol that includes error-checking and recovery (e.g., USB or CAN) of data transmitted through the cable. In at least one example, if there is too much interference and some of the data is corrupted, such a software protocol can retry the transmission until it is successful and keep a record of the overall BER. If the BER is zero, all data is transmitted successfully the first try. If the BER is above zero, some data is transmitted successfully the first try and some data has transmission errors due to interference and is re-transmitted until it succeeds. If the BER is very high, all data can include transmission errors and the data is re-transmitted. The software protocol can be used to transmit data across a moving joint and determine the angle or bend/rotation of the joint by monitoring the BER. The exact geometry and details of the software protocol with error checking and recovery can be fine-tuned so that the BER changes across an acceptable range to provide both reliable data transmission over a full range of motion of the joint and enough variance over the full range of motion such that BER varies enough to determine position.

Accordingly, the communication cable routed through the joint can act as a data transmission component as well as a position sensor without the need for any additional sensor components, such as accelerometers, encoders, inertial measurement units, and so forth. The communication cable can be a position sensor without the need for any additional data paths needed to send output of sensor elements to compute. In addition, no additional sensor elements are needed to compute data transmission time delays since the BER is already known.

These and other embodiments are discussed below with reference to FIGS. 1-9C. However, those skilled in the art will readily appreciate that the detailed description given herein with respect to these Figures is for explanatory purposes only and should not be construed as limiting. Furthermore, as used herein, a system, a method, an article, a component, a feature, or a sub-feature including at least one of a first option, a second option, or a third option should be understood as referring to a system, a method, an article, a component, a feature, or a sub-feature that can include one of each listed option (e.g., only one of the first option, only one of the second option, or only one of the third option), multiple of a single listed option (e.g., two or more of the first option), two options simultaneously (e.g., one of the first option and one of the second option), or combination thereof (e.g., two of the first option and one of the second option).

Figure 1:
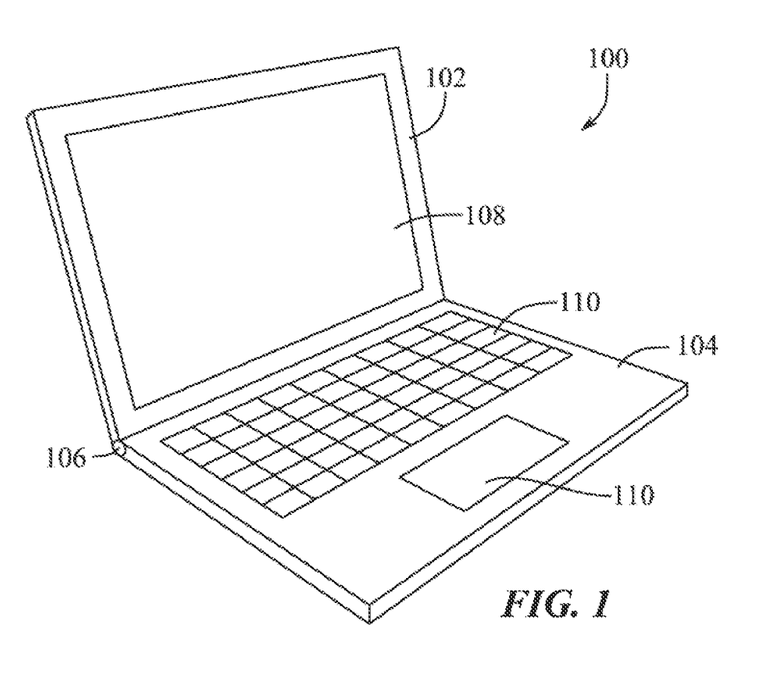
FIG. 1 shows a perspective view of an example of an electronic device having multiple portions rotatably connected.

FIG. 1 illustrates an example of an electronic device 100 including a first portion 102 rotatably secured to a second portion 104. The first portion 102 can be rotatably secured to the second portion 104 at a joint 106. In at least one example, the first portion 102 can include a display having a display screen 108 and the second portion 104 can include a base or base portion having one or more user input mechanisms 110. In the illustrated example, the electronic device 100 is a laptop computer having a display 108 and two input mechanisms 110, for example a keyboard and a touchpad. Examples of joints described herein, including the joint 106 shown in FIG. 1, can include one or more mechanisms where two portions of a device are attached and at which those portions can rotate relative to one another. The rotation or repositioning of parts at the joints can be passive, including user-induced movements and adjustments of devices, and/or can be active, including automatic adjustments of parts of a device about a joint using actuators such as motors. The computer device 100 shown in FIG. 1 can be an example of a device having a passive joint (e.g., one in which the user adjusts the various parts connected to the joint 106). Other examples can include self-articulating robots and other devices having actuators to automatically move and adjust parts about joints. The various joints described herein can apply to both passive, user-actuated joints as well as active, self-actuating joints.

In the illustrated example of FIG. 1, a user can input commands via the user input mechanisms 110 to visually alter displayed images or information on the display screen 108 of the first portion 102. When the user manipulates the input mechanism 110, an electronic signal can be sent to one or more components of the first portion 102, including the display screen 108, via a communications cable or other signal transferring component disposed in or extending through the joint 106. The joint 106 can include a mechanical mechanism enabling the first portion 102 to rotate relative to the second portion 104. In the example of the laptop shown in FIG. 1, the user can open or close the device 100 by rotating the first portion 102 towards or away from the second portion 104 about the joint 106.

In any of the examples of electronic devices disclosed herein, including the electronic device 100 shown in FIG. 1, multiple moving parts may be enabled by one or more joints 106 such that the physical configuration of the device 100 can be altered by the user. However, regardless of the physical configuration of the device 100, for example the angle between the first portion 102 and the second portion 104 shown in FIG. 1, the electronic signals can still be sent from one portion to another, or from the second portion 104 to the first portion 102 and vice versa. In at least some examples, the signals can be sent from one portion to another even during a movement of one portion relative to another via the joint 106. In at least one example, the electronic device 100 can be configured to detect the relative position of the first and second portions 102, 104. That is, in at least one example, the electronic device 100 can include a means for detecting the position or angle of the first portion 102 relative to the second portion 104 as the user adjusts the angle of the display screen 108 relative to the input mechanisms 110.

In response to the detected position of the first portion 102 relative to the second portion 104, the device 100 can be configured to adapt a functionality based on the position. In one example, the first portion 102 can be rotated all the way down to close against and contact the second portion 104 to instigate a sleeping or powered down mode. In another example, the user may only partially rotate first portion 102 away from the second portion 104 to instigate a sleeping, reduced screen brightness, or hidden mode. In one or more other examples, the device 100 can be configured to adapt a functionality based on a fully open configuration where the first portion 102 is fully rotated away from the second portion 104. In at least one example, the device 100 can include a three-dimensional (3D) tracking assembly and functionality to determine where in space a separate user input mechanism is positioned. In such an example, the angle of the first portion 102 relative to the second portion 104 can be taken into account in a 3D tracking algorithm to track a 3D input device manipulated by the user in space. Other functionalities based on a relative position or angle of the first portion 102 and the second portion 104 can be implemented based on the detected position of different portions of the device 100 relative to one another.

Any of the features, components, and/or parts, including the arrangements and configurations thereof shown in FIG. 1 can be included, either alone or in any combination, in any of the other examples of devices, features, components, and parts shown in the other figures. Likewise, any of the features, components, and/or parts, including the arrangements and configurations thereof shown in the other figures can be included, either alone or in any combination, in the example of the devices, features, components, and parts shown in FIG. 1.

Figure 2:
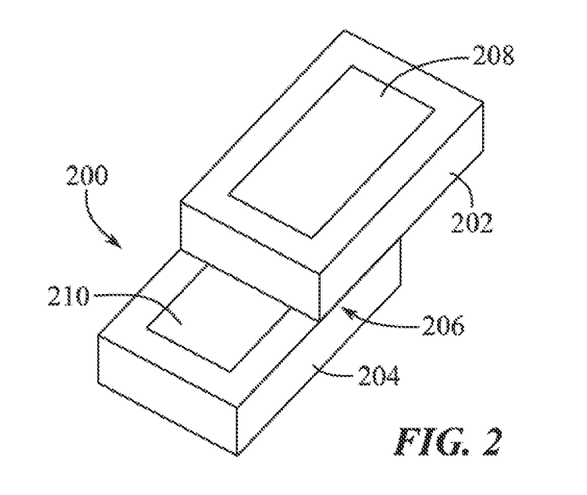
FIG. 2 shows a perspective view of another example of an electronic device having multiple portions rotatably connected.

FIG. 2 illustrates another example of an electronic device 200 including a first portion 202 and a second portion 204. In the illustrated example of FIG. 2, the electronic device 200 includes a sliding joint or mechanism 206 enabling user to adjust the position of the first portion 202 relative to the second portion 204. In at least one example, the first portion can include a first electronic component 208 and the second portion 204 can include a second electronic component 210. In at least one example, the first electronic component 208 includes a display or display screen and a second electronic component 210 includes an input mechanism.

In the illustrated example of FIG. 2, the sliding joint 206 enables a user to translate the first portion 202 relative to the second portion 204 as desired. The user can do so to cover and uncover the second electronic component 210 of the second portion 204 as desired. As noted above with reference to other examples, the device 200 can include a means for detecting a relative position of the first and second portions 202, 204 during use such that functionalities, modes, and features of the electronic device 200 can be enabled are disabled based on those positions. In addition, input or output signals can be transferred from the first electronic component 210 to the second electronic component 28 of the device 200, and vice versa, through the sliding joint 206. This communication signal transferred from various portions or components of the electronic device 200 can be transferred regardless of the configuration of the joint 206 dictating the relative positions of the first portion 202 and the second portion 204.

Any of the features, components, and/or parts, including the arrangements and configurations thereof shown in FIG. 2 can be included, either alone or in any combination, in any of the other examples of devices, features, components, and parts shown in the other figures. Likewise, any of the features, components, and/or parts, including the arrangements and configurations thereof shown in the other figures can be included, either alone or in any combination, in the example of the devices, features, components, and parts shown in FIG. 2.

Figure 3A:
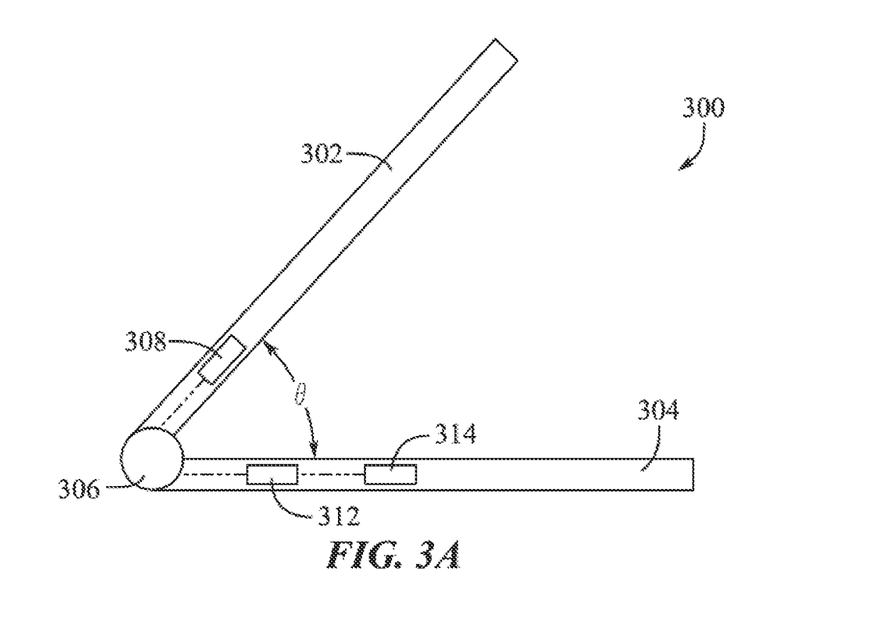
FIG. 3A shows a side view of an example of an electronic device having multiple portions rotatably connected at a joint.
Figure 3B:
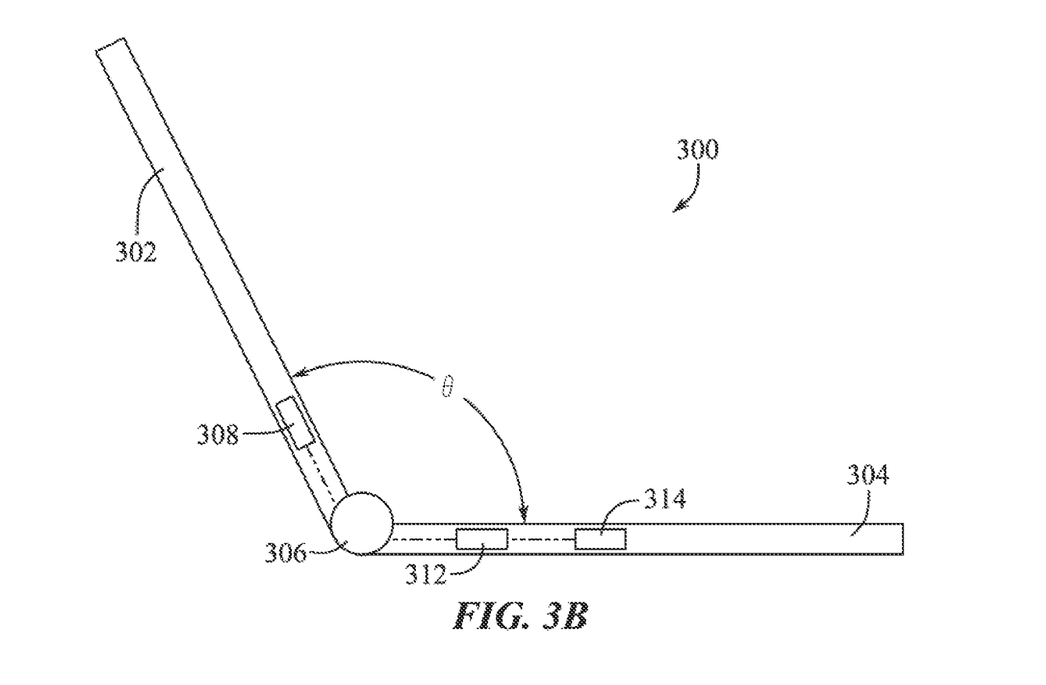
FIG. 3B shows another view thereof with the multiple portions in different positions.

FIGS. 3A and 3B illustrate side views of an example of an electronic device 300, including a first portion 302 rotatably or adjustably connected to a second portion 304 at a joint 306. FIG. 3A illustrates the device 300 with the first portion 302 positioned at a first angle θ relative to the second portion 304. FIG. 3B illustrates the same device 300 with the first portion 302 position relative to the second portion 304 at the angle θ greater than that shown in FIG. 3A. The device 300 can include a processor 312 electrically connected to a memory component 314 storing electronic instructions that, when executed by the processor 312, configured the electronic device 300 to transmit data through the joint 306 to an electronic component 308 of the first portion 302. The processor 312 can include an integrated electronic circuit that performs calculations that run a computer. The processor 312 can include one or more microprocessors and/or central processing units. The dotted lines illustrated in FIGS. 3A and 3B illustrate the electronic connectivity or communication coupling between the various components including the memory component 314, the processor 312, the joint 306, and the electronic component 308. In at least one example, electronic communication coupling can be hardwired.

In at least one example, the joint 306 of the electronic device 300 can include a data communication component (not illustrated in FIGS. 3A and 3B), examples of which are illustrated in subsequent figures described herein, configured to transmit data across the joint 306 as the user manipulates the position of the first portion 302 relative to the second portion 304 and regardless of the magnitude of the angle θ. In at least one example, the data communication component of the joint 306 can be used to detect or measure the angle θ. In at least one example, the data communication component can include a cable such as a flat communication flex cable extending through the joint 306 and electrically connected to the processor 312 at one end and to the electronic component 308 at the other end on either side of the joint 306. In at least one example, as the angle θ changes, as shown in the difference between the angle θ of FIG. 3A and FIG. 3B, the data communication component can change shape, position, or configuration within the joint 306 as the component extends from the first portion 302 to the second portion 304 through the joint 306.

In at least one example, the joint 306 can include data communication components configured to detect a relative position of the various portions of the electronic device 300, for example the angle θ at which the first portion 302 is disposed relative to the second portion 304, based on the change in shape, position, or configuration of the data communication component within the joint 306. For example, as the processor 312 transmits data through the joint 306, one or more electronic communication components within the joint 306 may result in a BER of the data transferred. In examples described herein, the angle θ of the first portion 302 relative to the second portion 304 can physically rotate or otherwise alter the joint 306 and any communication components therein. The change or adjustment of the physical configuration of the data communication components within the joint 306 can affect the BER of the data transmitted through the joint 306.

Examples of electronic communication components within joints such as the joint 306 shown in FIGS. 3A and 3B are described in more detail below with reference to other figures. However, here it is noted that the processor 312 can be configured to determine or detect the angle θ based on the BER of data transmitted through the joint 306. Depending on the configuration of the data communication component extending through the joint 306, the BER of data transmitted through the joint 306 can be directly proportional to the angle θ or the BER can be inversely proportional to the angle θ. As noted above with reference to other examples, the various portions of an electronic device can be variably positioned relative to one another either rotatably, translatably, or otherwise adjustably positioned and able to be manipulated by the user. Any of these changes in position between various portions of an electronic device, which increase or decrease the magnitude of the angle θ, can be detected based on the BER of data transmitted through the one or more joints or coupling mechanisms that enable movement between different portions of the device.

Any of the features, components, and/or parts, including the arrangements and configurations thereof shown in FIGS. 3A and 3B can be included, either alone or in any combination, in any of the other examples of devices, features, components, and parts shown in the other figures. Likewise, any of the features, components, and/or parts, including the arrangements and configurations thereof shown in the other figures can be included, either alone or in any combination, in the example of the devices, features, components, and parts shown in FIGS. 3A and 3B.

Figure 4:
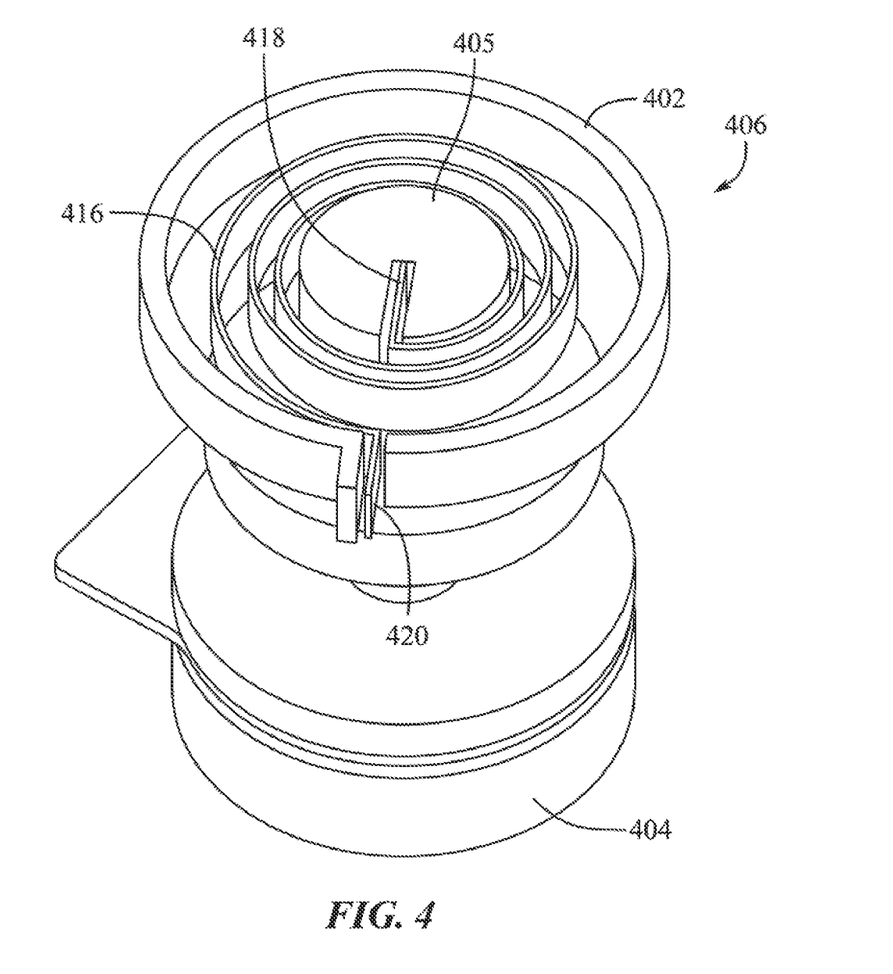
FIG. 4 shows an example of a joint of an electronic device.

FIG. 4 illustrates a perspective view of a portion of an electronic device including a joint 406 coupling a first portion 402 a second portion 404 of the device. The second portion 404 can include an axle or hub 405 rotatable relative to the first portion 402. In at least one example, the joint 406 can include a flat flexible communications cable 416 wound in the configuration of a clock spring. In at least one example, the cable 416 can be a data transfer cable configured to transmit/transfer data, including electrical signals, through the cable 416. The cable 416 can form a clock spring having multiple coils. The clock spring cable 416 can include a conductive material such as metal capable of transmitting electronic signals there through. In at least one example, the clock spring cable 416 can include multiple rings or coils allowing a rotation of the first portion 402 relative to the second portion 404 of an electronic device. The clock spring cable 416 can include a first end 420 physically connected with or fixed to the first portion 402 and a second end 418 physically connected or fixed with the hub 405 of the second portion 404. In at least one example, the first end 420 is electrically connected with one or more electronic components of an electronic device and the second and 418 is electronically connected to another component of the electronic device, for example a processor and/or a data transmitter configured to receive and send electronic signals through the clock spring cable 416.

As noted above, the clock spring cable 416 can include multiple coils or rings concentrically disposed adjacent to one another. In one or more examples described herein, the various coils or rings of the clock spring cable 416 can be referred to as different portions thereof, for example a first portion including a first coil or ring and a second portion including a second coil or ring of the clock spring cable 416 adjacent the first portion. In at least one example, during use, the first portion 402 of the device or joint 406 may be rotated relative to the second portion 404, thus manipulating the clock spring cable 416 to correspondingly move the first and second ends 420, 418 fixedly secured thereto, to rotate and tighten or loosen adjacent rings/coils of the clock spring cable 416. In at least one example, the clock spring cable 416 can include adjacent rings or coils electrically exposed to one another without an intermediate shielding components. In this way, the term "adjacent" as used herein can refer to portions of the clock spring cable 416 position next to one another without any intermediate components and materials disposed there between. In at least one example, the clock spring cable 416 does not include any electric shielding coatings or components between adjacent coils or rings such that the adjacent portions or rings of the clock spring cable 416 are completely electrically exposed to one another. In at least one example, the clock spring cable 416 can be all of or a part of a position sensor measuring or detecting the relative angle or angular positioned between the first portion 402 and the second portion 404 of an electronic device as the first and second portions 402, 404 of the device are rotated relative to one another.

Any of the features, components, and/or parts, including the arrangements and configurations thereof shown in FIG. 4 can be included, either alone or in any combination, in any of the other examples of devices, features, components, and parts shown in the other figures. Likewise, any of the features, components, and/or parts, including the arrangements and configurations thereof shown in the other figures can be included, either alone or in any combination, in the example of the devices, features, components, and parts shown in FIG. 4.

Figure 5A:
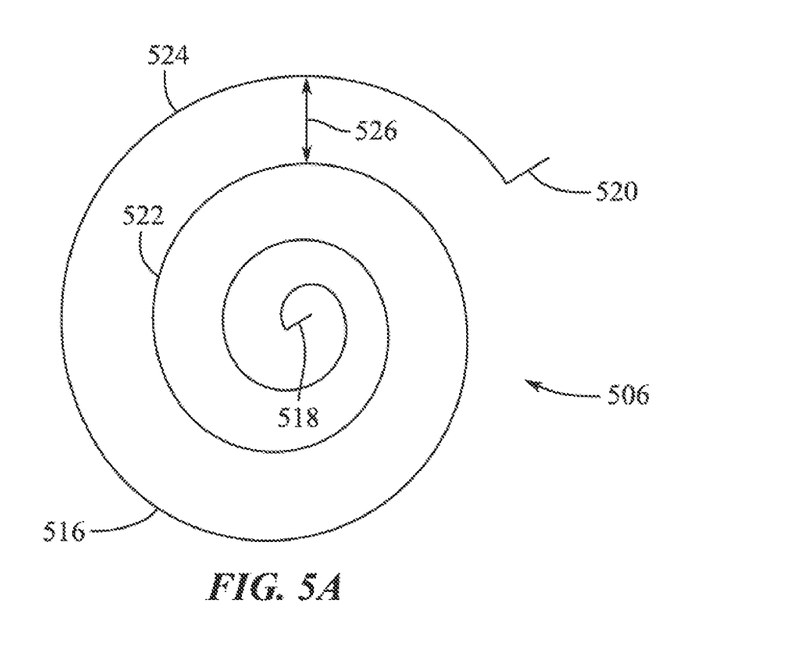
FIG. 5A shows an example of a position sensor of an electronic device in a first position.

FIG. 5A illustrates another example of a position sensor joint 506 including a clock spring cable 516 having multiple rings or coils. The clock spring cable 516 can be a data transfer cable configured to transfer data through the joint 506. The position sensor joint 506 can be a part of a joint between two separate portions of an electronic device. In the illustrated example of FIG. 5A, a first coil or portion 522 is disposed adjacent a second coil or portion 524. In at least one example, the first coil of the clock spring cable 516 includes the first portion 522 and a second coil of the clock spring cable 516 includes the second portion 524. In the illustrated example of FIG. 5A, the second portion 524 is part of an outer coil or ring of the spiral clock spring configuration. In the other adjacent rings, coils, or segments thereof can include other adjacent portions or a sub-portions of the clock spring cable 516. The portions 522, 524 indicated in FIG. 5A are pointed out for exemplary purposes but any other portion or section of the clock spring cable 516 can define other portions or sections adjustably positioned adjacent to one another.

A distance 526 between the first portion 522 and the second portion 524 of the position sensor joint 506 is a first magnitude when the first end 520 and the second end 518 of the clock spring cable 516 are disposed at a first angle or position relative to one another, as shown in FIG. 5A. Also, in at least one example, the first portion 522 is electrically unshielded from the second portion 524. In at least one example, the position sensor joint 506 does not include any electric shielding components or coatings between the first portion 522 and the second portion 524. In this way, in at least one example, the self-interference of the position sensor joint 506 can be increased to provide an easily detectable BER for correlating position. In addition, in such examples where BER is a desired characteristic to take advantage of for determining position, the absence of shielding reduces cost and manufacturing complexity of the position sensor joint 506. In at least one example, the magnitude of the distance 526 between the first portion 522 and the second portion 524 is variable. For example the distance 526 can vary based on the relative angular positions of the first end 520 and the second and 518 of the clock spring cable 516.

Figure 5B:
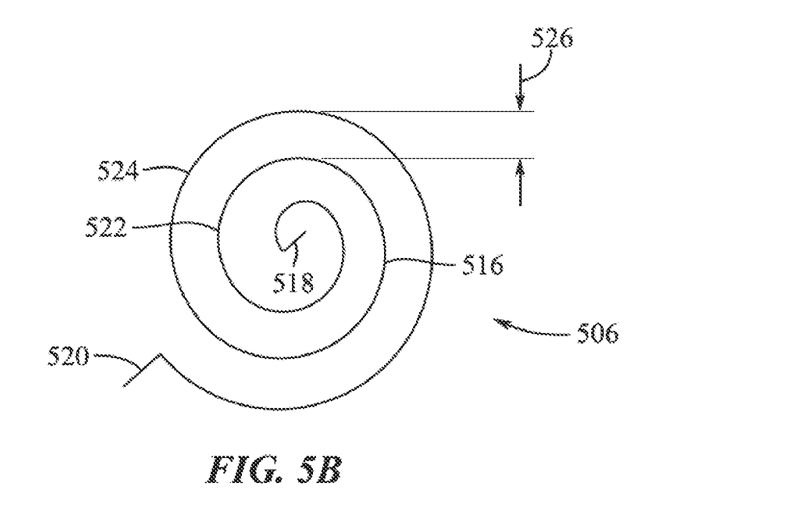
FIG. 5B shows an example of a position sensor of an electronic device in a second position.

For example, as shown in FIG. 5B, the second and 518 of the clock spring cable 516 remains fixed while the second and 520 is rotated clockwise to a different position. In such a position, the distance 526 between the first portion 522 and the second portion 524 is reduced as the clock spring configuration of the clock spring cable 516 winds tighter. This winding or change in the distance 526 between the first and second portions 522, 524 can occur when the user rotates two or more portions of an electronic device to which the first and second ends 520, 518 of the clock spring cable 516 are fixed, respectively, about a joint including the position sensor joint 506. As noted above, in either position shown in FIGS. 5A and 5B, the clock spring cable 516 can be used to transmit data through the joint. Because the parasitic capacitance and self-inductance of the clock spring cable 516 is proportional to a distance between two overlapping or adjacent portions of the clock spring cable 516, for example the first portion 522 and the second portion 524, the less the distance 526 between the 2 portions 522, 524, the higher the parasitic coupling and self-interference. The higher the self-interference, the higher the BER of the data transmitted through the clock spring cable 516 may tend to be.

Some examples of the clock spring cable 516 can include various forms or degrees of electrical shielding between portions 522, 524 of the clock spring cable 516 with the varying distance between portions still affecting the BER of data transmitted there through. In some examples, the clock spring cable 516 is without any electrical shielding between the portions 522, 524, such that the BER may be more dramatically affected by the distance 526. That is, without any shielding, the BER can be increased for easier detection and correlation to position.

Thus, because the distance 526 between the first and second portions 522, 524 of the clock spring cable 516 is less in the position shown in FIG. 5B than the distance 526 in the position shown in FIG. 5A, the BER of the data transmitted through the clock spring cable 516 in the first position shown in FIG. 5A can be less than the BER of the data transmitted in the clock spring cable 516 in the second position shown in FIG. 5B. Accordingly, the BER varies based on the rotation or position of the certain portions of the clock spring cable 516, which can be a result of various portions of an electronic device being moved or repositioned. In at least one example, a processor electrically connected to the clock spring cable 516 can measure the BER of data transmitted there through and determine a position of the first and second ends 520, 518 of the cable 516 and thus determine the position or rotation of a joint, including the relative positions of two portions of an electronic device secured together at the joint, based on the BER. The processor can measure the BER of the data and correlate the bit error rate to the position, based on a historical or predictive relationship between the bit error rate, and the relative positions of the two portions of the electronic device.

While the first and second portions 522, 524 correlating to inner and outer coils of the clock spring cable 516 are shown and used as examples in FIGS. 5A and 5B, one or more other examples can include any other adjacent portions, including coils or segments thereof, adjacent to one another with varying distance there between as the electronic device is repositioned. In at least one example, such as the clock spring configuration shown in FIGS. 5A and 5B, a total or average distance between adjacent portions of the clock spring cable 516 can vary all along a length of the clock spring cable 516. This total or overall distance separating all adjacent portions of the clock spring cable 516 can affect the BER, which can be measured by an electronically connected processor to determine a position of the first and second ends 520, 518 of the clock spring cable 516. In this way, the joint 506 including the clock spring cable 516 can be a position sensor for determining the position of any two portions of an electronic device connected at the joint 506 without any need for additional position sensors, position sensor components, or other data channels or paths.

In at least one example, the memory component 314 shown in FIGS. 3A and 3B can be connected to a processor connected to the clock spring cable 516 shown in FIGS. 5A and 5B. The memory component 314 can include electronic instructions for the processor to execute a software protocol that includes error-checking and recovery (e.g., USB or CAN) of data transmitted through the cable 516. In at least one example, if there is too much interference and some of the data is corrupted, such a software protocol can retry the transmission until it is successful and keep a record of the overall BER. If the BER is zero, all data is transmitted successfully the first try. If the BER is above zero, some data is transmitted successfully the first try and some data has transmission errors due to interference and is re-transmitted until is succeeds. If the BER is very high, all data can include transmission errors and the data is re-transmitted. The software protocol can be used to transmit data across a moving joint 506 and determine the angle or bend/rotation of the joint 506 by monitoring the BER. The exact geometry and details of the software protocol with error checking and recovery can be fine-tuned so that the BER changes across an acceptable range to provide both reliable data transmission over a full range of motion of the joint 506 and enough variance over the full range of motion such that BER varies enough to determine position.

Accordingly, the communication cable 516 routed through the joint 506 can act as a data transmission component as well as a position sensor without the need for any additional sensor, such as accelerometers, encoders, inertial measurement units, and so forth. The communication cable 516 can be a position sensor without the need for any additional data paths needed to send output of sensor elements to compute. In addition, no additional sensor elements are needed to compute data transmission time delays since the BER is already known.

Any of the features, components, and/or parts, including the arrangements and configurations thereof shown in FIGS. 5A and 5B can be included, either alone or in any combination, in any of the other examples of devices, features, components, and parts shown in the other figures. Likewise, any of the features, components, and/or parts, including the arrangements and configurations thereof shown in the other figures can be included, either alone or in any combination, in the example of the devices, features, components, and parts shown in FIGS. 5A and 5B.

Figure 6:
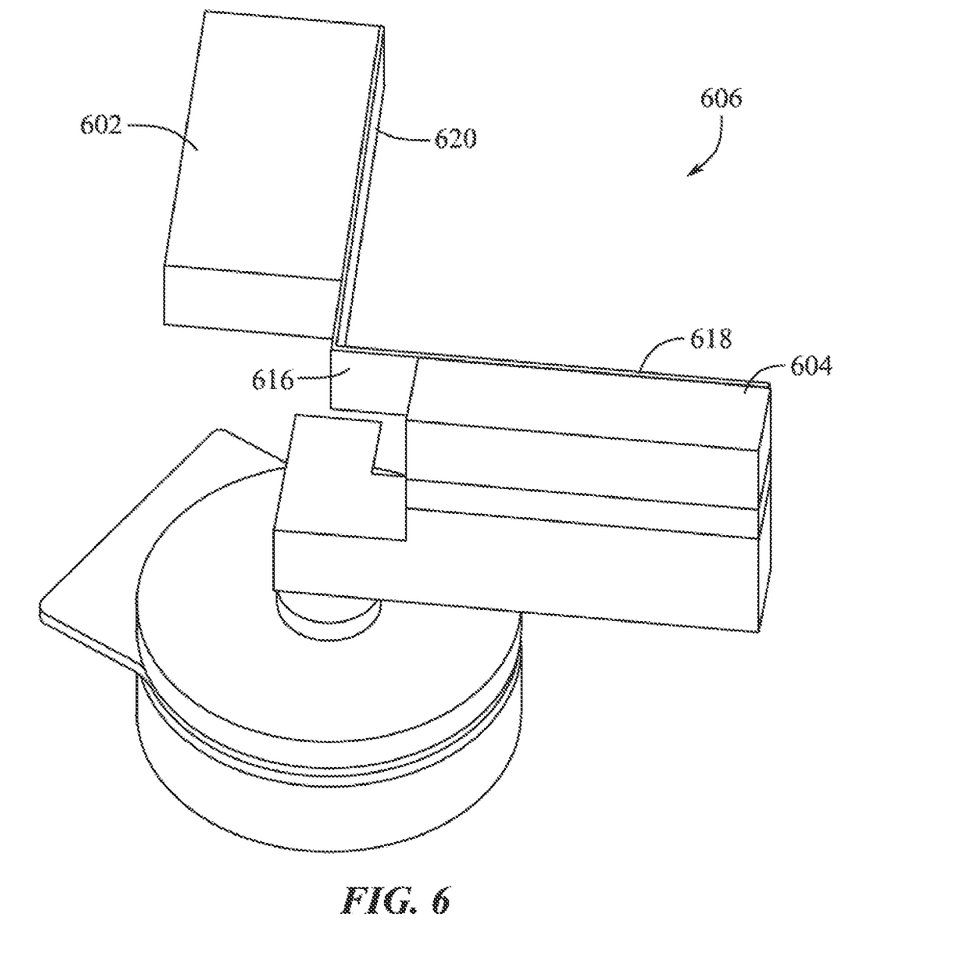
FIG. 6 shows an example of a joint of an electronic device.

FIG. 6 illustrates another example of a joint 606 rotatably connecting a first portion 602 of an electronic device with the second portion 604 of an electronic device. In particular, the example shown in FIG. 6 illustrates a communication cable 616, which in one example can include a flat, flexible cable formed of electrically conductive material. The flat, flexible cable can include a width greater than a height such that the cable is more flexible in one direction (e.g., more flexible across a flex/fold axis extending across the width) than the other (e.g., less flexible across a flex/fold axis extending across the height). The flat, flexible cable may be defined as a laminar, flat cable as opposed to rounded, cylindrical cables. The communication cable 616 can include a first arm 620 and the second arm 618. The first arm 620 can be secured to or disposed with the first portion 602 and the second arm 618 can be disposed with or secured to the second portion 604. In at least one example, the first arm 620 and the second arm 618 of the communication cable 616 are disposed at an angle relative to one another at a bend portion. The angle between the first arm 620 and the second arm 618 can be changed as the first portion 602 of the electronic device is manipulated relative to the second portion 604 of the electronic device.

In at least one example, the communication cable 616 is formed of a sufficiently flexible material and/or of a sufficiently thin configuration such that a bend portion between the first arm 620 and the second arm 618 can allow the first arm 620 and the second arm 618 2 be rotated relative to one another with the communication cable 616 being a single unitary piece. In at least one example, the bend portion between the first arm 620 and the second arm 618 of the communication cable 616 includes a minimum radius of curvature at which the communication cable 616 maintains structural integrity without plastic deformation during use.

Any of the features, components, and/or parts, including the arrangements and configurations thereof shown in FIG. 6 can be included, either alone or in any combination, in any of the other examples of devices, features, components, and parts shown in the other figures. Likewise, any of the features, components, and/or parts, including the arrangements and configurations thereof shown in the other figures can be included, either alone or in any combination, in the example of the devices, features, components, and parts shown in FIG. 6.

Figure 7A:
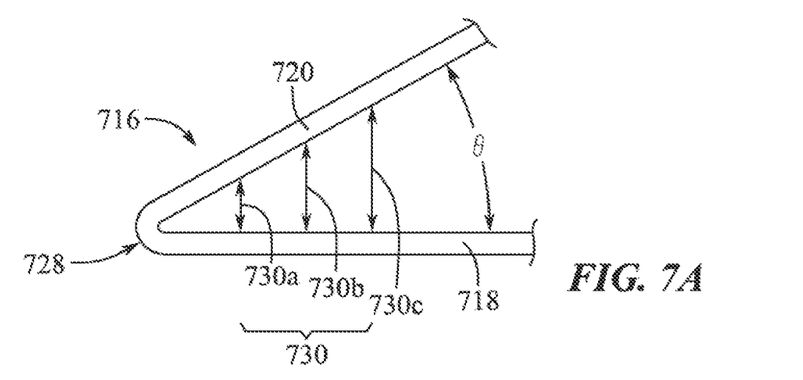
FIG. 7A shows an example of a communication cable of a position sensor in a first position.

FIG. 7A illustrates another example of a communication cable 716 including a first arm 720 and the second arm 718 joined at a bend portion 728. The communication cable 716 can be part of, or connected through, the joint of an electronic device such that the first arm 720 articulates with the first portion of the electronic device and the second arm 718 of the communication cable 716 articulates with a second portion of the electronic device. As the user articulates the first portion relative to the second portion via a joint, the first arm 720 of the communication cable 716 can move relative to the second arm 718. The bend portion 728 can be a section of the communication cable 716 extending between the first arm and 20 and the second arm 718.

In at least one example, the communication cable 716 is formed of a sufficiently flexible material and/or of a sufficiently thin configuration such that a bend portion between the first arm 720 and the second arm 718 can allow the first arm 720 and the second arm 718 to be rotated relative to one another with the communication cable 716 being formed as a single unitary piece. In at least one example, the bend portion between the first arm 720 and the second arm 718 of the communication cable 716 can include a minimum radius of curvature at which the communication cable 716 maintains structural integrity without plastic deformation during use.

As shown in FIG. 7A, the first arm 720 and the second arm 718 can define an angle θ at which the first and second arms 720, 718 are positioned relative to one another. In addition, FIG. 7A indicates a distance 730 between the first arm 720 and the second arm 718 of the communication cable 716, the distance 730 including an average distance between the first and second arms 720, 718, which can be angled relative to one another such that the distance between any two points of the first arm 720 and the second arm 718 are different along a length thereof. Thus, as indicated in FIG. 7A, the distance 730 between the first arm 720 and the second 718 can be visualized as an average of a number of separate distances 730a, 730b, and 730c.

Figure 7B:
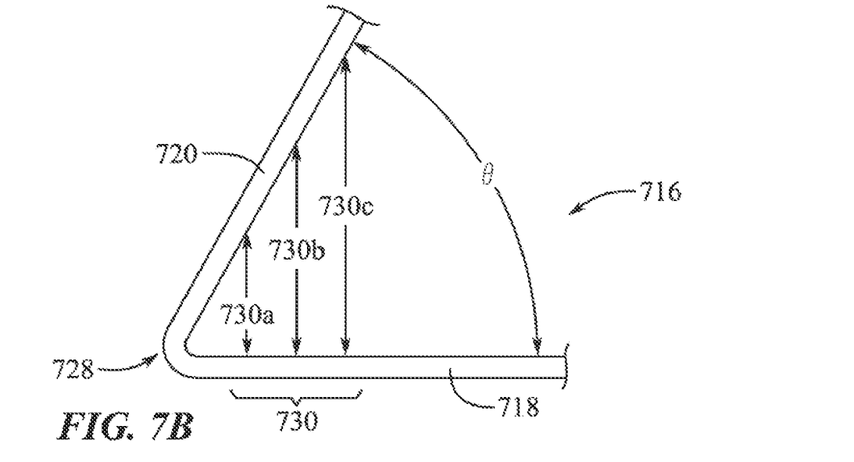
FIG. 7B shows an example of a communication cable of a position sensor in a second position.

As noted above with reference to other examples described herein, a distance between various portions or arms of a communication cable 716 can affect the BER of data sent through the cable 716. In the example of a communication cable 716 shown in FIG. 7A, the less the distance 730 between the two arms 720, 718, the higher the parasitic coupling and self-interference of the cable 716. The higher the self-interference, the higher the BER of the data transmitted through the communication cable 716 may tend to be. As shown in FIG. 7B, where the first arm 720 and rotated away from the second arm 718 such that the angle θ is greater, the distance 730 between the first arm 720 and the second arm 718, as represented by the individual distance and 730a, 730b, and 730c, has increased. This may be the case, for example, when a user rotates a first portion of an electronic device relative to a second portion via a joint including the communication cable 716. Because the distance 730 in the position of the communication cable 716 shown in FIG. 7B is greater than the distance 730 between the first arm 720 and the second arm 718 in the position shown in FIG. 7A, the BER of data sent through the communication cable in the position shown in FIG. 7B may be less due to the increased distance 730 and decreased self-interference between the first and second arms 720, 718. Conversely, the BER of data sent through the communication cable 716 shown in the position of FIG. 7A is greater due to the decreased distance 730 and higher self-interference.

Figure 7C:
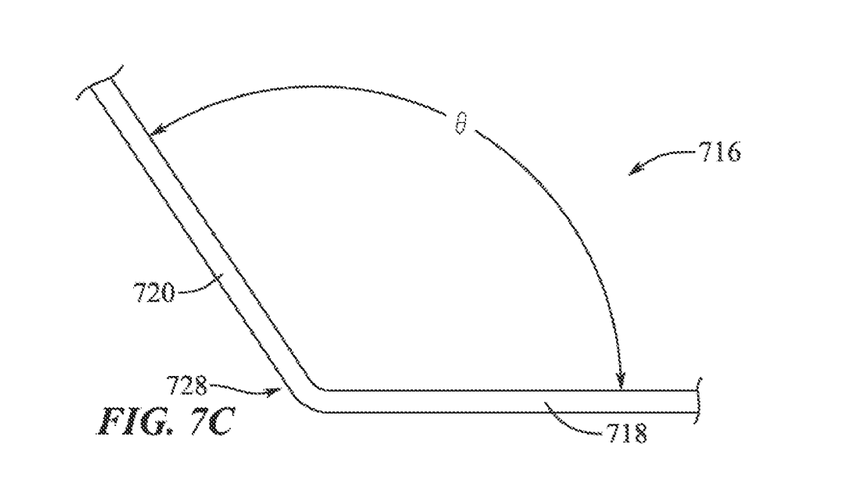
FIG. 7C shows an example of a communication cable of a position sensor in a third position.

FIG. 7C shows the communication cable 716 open even further with the greater angle θ between the first arm 720 and the second arm 718 as the first arm 720 as rotated away from the second arm 718 about the bend portion 728. In such a position, the BER of data carried by and through the communication cable 716 can be even less in that shown in the positions of FIGS. 7A and 7B. The communication cable 716 shown in FIG. 7A-7C can be electrically connected with one or more other electronic components of an electronic device, for example one or more processors, such that the BER of data sent through the communication cable 716 can be used to detect a position of the joint through which the communication cable 716 extends. For example, the BER can be measured to determine the angle θ between the first arm 720 and the second arm 718 of the communication cable 716.

Thus, the BER can be correlated to the angle θ. In this way, a position sensor of an electronic device can utilize the communication cable 716 for determining the position of the first portion of an electronic device relative to the second portion of an electronic device without any additional position sensing components or data paths in addition to the communication cable 716.

Any of the features, components, and/or parts, including the arrangements and configurations thereof shown in FIGS. 7A-7C can be included, either alone or in any combination, in any of the other examples of devices, features, components, and parts shown in the other figures. Likewise, any of the features, components, and/or parts, including the arrangements and configurations thereof shown in the other figures can be included, either alone or in any combination, in the example of the devices, features, components, and parts shown in FIGS. 7A-7C.

Figure 8A:
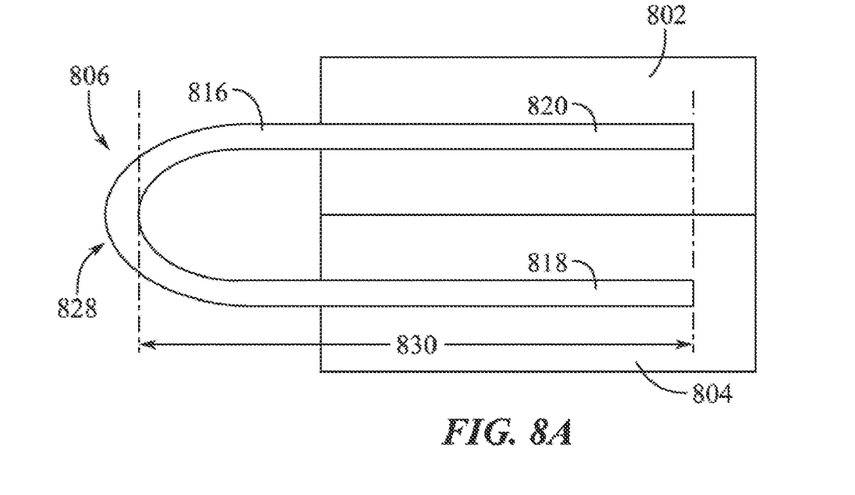
FIG. 8A shows an example of a communication cable of a position sensor in a first position.
Figure 8B:
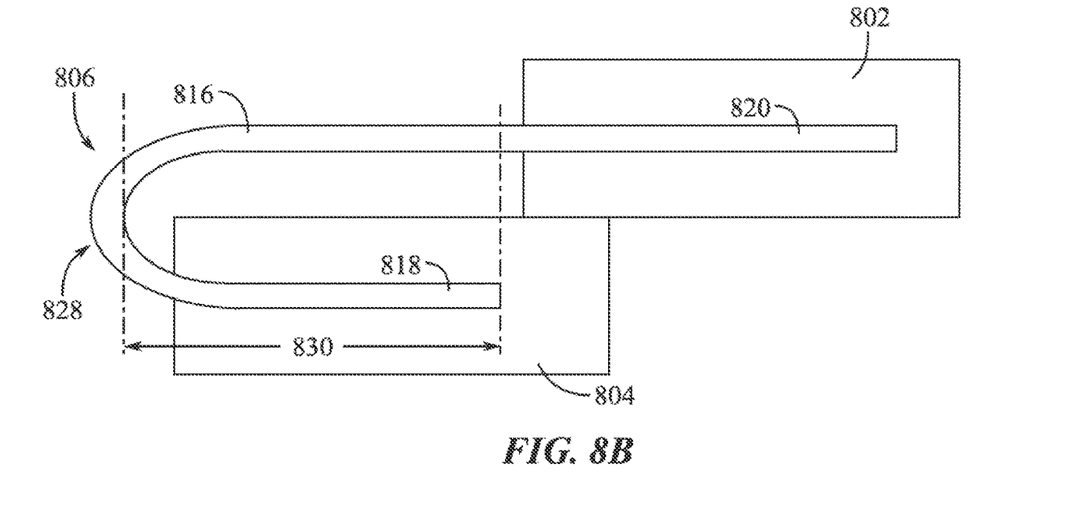
FIG. 8B shows an example of a communication cable of a position sensor in a second position.

FIGS. 8A and 8B illustrate an example of the position sensor 806 including a communication cable 816 having a first portion 820 and a second portion 818 connected at a bend portion 828. In the illustrated example of FIGS. 8A and 8B, the position sensor 806 can be part of a sliding joint between the first portion 802 of an electronic device and the second portion 804 of an electronic device. In such a sliding joint configuration, the first portion 802 can be slidably translated relative to the second portion 804 and the first portion 820 of the communication cable 816 can be connected with the first portion 802 of the electronic device and the second portion 818 of the communication cable 816 can be connected with the second portion 804 of the electronic device. In this way, as a user translates the first portion 802 of the electronic device relative to the second portion 804 of the electronic device, the relative positions of the first and second portions 820, 818 of the communication cable 816 can vary.

In at least one example, the first portion 820 of the communication cable 816 extends from the bend portion 828 at a first length and the second portion 818 of the communication cable 816 extends from the bend portion 828 at a second length. In at least one example, the first portion 820 is positioned relative to the second portion 818 to define an overlap length 830 equal to the shorter length of the first length and the second length. In at least one example, the first length and the second length are variable to change a position of the second portion 818 relative to the first portion 820.

FIG. 8A shows a first position of the communication cable 816 where the first portion 820 overlaps the second portion 818 at a first overlap length 830. FIG. 8B shows a second position of the communication cable 816 as part of the position sensor 806 where the first portion 802 of the electronic device has been translated relative to the second portion 804 of the electronic device. In such a position, the first portion 820 of the communication cable 816 has likewise been translated relative to the second portion 18 of the electronic communication cable 816 such that the overlap length 830 between the first portion 820 and the second portion 818 is reduced.

The parasitic capacitance and self-inductance of the communication cable 816 is proportional to the overlap distance 830 between the first and second portions 820, 818, The less the overlap distance 830 is, the higher the parasitic coupling and self-interference of the communication cable 816. The higher the self-interference, the higher the BER of the data transmitted through the communication cable 816 may tend to be. Accordingly, one or more processors or other electronic components electrically connected to the communication cable 816 can determine a relative position of the first and second portions 802, 804 of the an electronic device based on the BER of data transmitted through the communication cable 816. The BER can be correlated to the overlap distance 830. In this way, the position sensor 806 can utilize the communication cable 816 for determining the position of the first portion 802 of the electronic device relative to the second portion 804 without any additional position sensing components or data paths in addition to the communication cable 816.

In the illustrated examples of FIGS. 8A and 8B, the communication cable 816 can include a flat, flexible cable formed of electrically conductive material. The flat, flexible cable can include a width greater than a height such that the cable is more flexible in one direction (e.g., more flexible across a flex/fold axis extending across the width) than the other (e.g., less flexible across a flex/fold axis extending across the height). The flat, flexible cable may be defined as a laminar, flat cable as opposed to rounded, cylindrical cables. In at least one example, the communication cable 816 does not include any electric shielding components or coatings disposed between the first and second portions 820, 818 thereof.

Any of the features, components, and/or parts, including the arrangements and configurations thereof shown in FIGS. 8A and 8B can be included, either alone or in any combination, in any of the other examples of devices, features, components, and parts shown in the other figures. Likewise, any of the features, components, and/or parts, including the arrangements and configurations thereof shown in the other figures can be included, either alone or in any combination, in the example of the devices, features, components, and parts shown in FIGS. 8A and 8B.

Figure 9A:
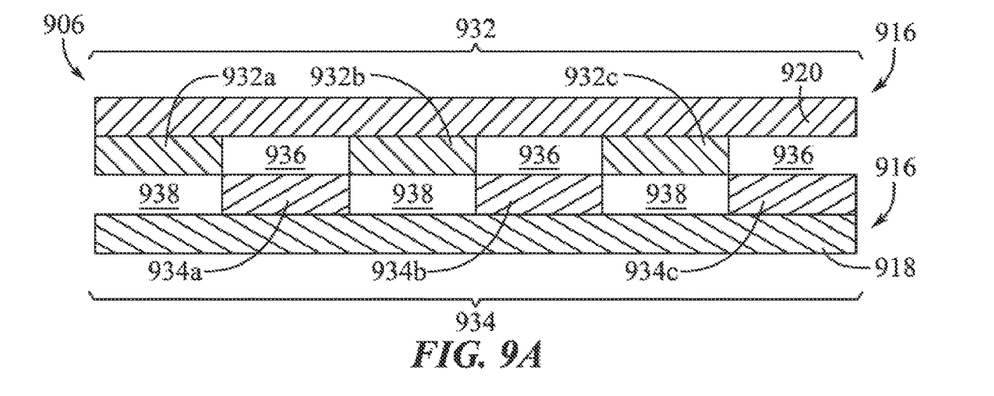
FIG. 9A shows an example of a communication cable of a position sensor in a first position.
Figure 9B:
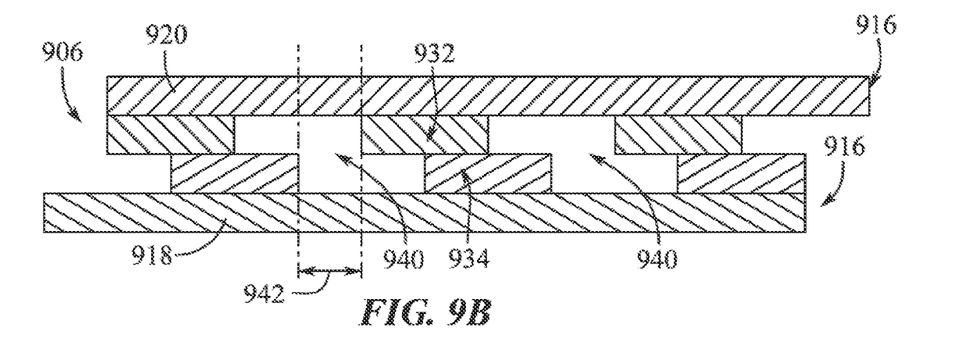
FIG. 9B shows an example of a communication cable of a position sensor in a second position.
Figure 9C:
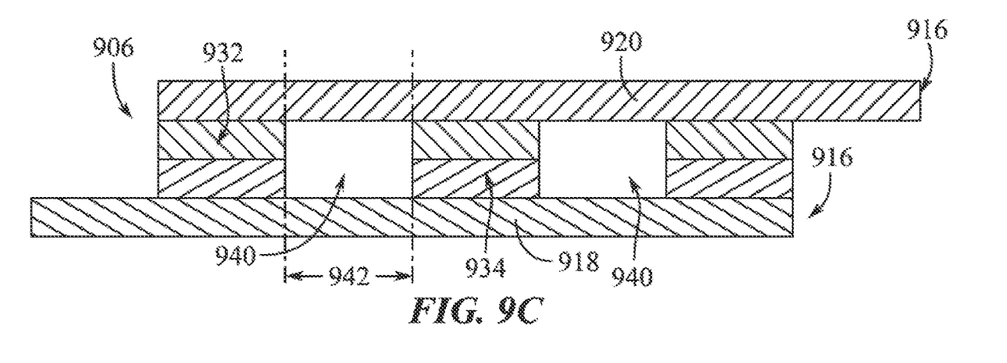
FIG. 9C shows an example of a communication cable of a position sensor in a third position.

FIG. 9A illustrates an example of a position sensor 906 including a communication cable 916. The communication cable 916 includes a first portion 918 and a second portion 920 spaced apart from one another. The communication cable 916 can be a part of or disposed within a joint of an electronic device connecting first and second portion thereof. In at least one example, the first and second portions 920, 918 of the communication cable 916 shown in FIGS. 9A-9C can be a part of a single communication cable 916, for example a clock spring cable or a bent cable as shown and described with reference to other figures. In such examples, the first and second portions 920, 918 of the communication cable 916 shown in FIGS. 9A-9C illustrate only portions of the communication cable 916 which can be connected as part of a single communication cable 916.

In at least one example the position sensor 906 can also include a variable shield disposed between the first portion 920 and the second portion 918. In at least one example, the variable shield can include a first electric shield 932 having discrete shielding portions 932a, 932b, 932c defining intermittent gaps 936. The discrete shielding portions 932a, 932b, 932c can be separated by the gaps 936. The variable shield can also include a second electric shield 934 having discrete shielding portions 934a, 934b, 934c separated by gaps 938. The shielding portions 934a, 934b, and 934c of the variable shield are configured to electrically shield the first portion 920 of the communication cable 916 from the second portion 918 of the communication cable 916 to reduce self-interference due to parasitic capacitance between the first and second portions 920, 918.

In at least one example, the first and second electrical shields 932, 934 can be disposed between the first and second portions 920, 918 of the communication cable 916. The first and/or second electric shields 932, 934 can include coatings or components formed of electrical shielding material to prevent or reduce parasitic capacitance and self-inductance of the communication cable 916 due to the proximity of the first and second portions 920, 918 thereof. In at least one example, the first electric shield 932 can be connected with the first portion 920 of the communication cable 916 and the second electric shield 934 can be connected with the second portion 918 of the communication cable 916 such that the degree to which the variable shield prevents interference between the first and second portions 920, 918 of the communication cable 916 as data is transmitted there through can vary depending on the relative positions of the first and second portions 920, 918 of the communication cable 916.

In at least one example, the variable shield can electrically shield the first portion 920 from the second portion 918 to a first degree when the first portion 920 is in a first position relative to the second portion 918 and to a second degree different than the first degree when the first portion 920 is in a second position relative to the second portion 918. As noted above, the first and second electric shields 932, 934 of the variable shield can include intermittent gaps 936, 938, respectively, exposing the first portion 920 and/or the second portion 918. As the positions of the first and second portions 920, 918 move relative to one another, the relative positions of the discrete shielding portions 932a-c, 934a-c and intermittent gaps 936, 938, respectively, move in position relative to one another as well. As shown in FIG. 9A, the first portion 920 of the communication cable 916 is positioned relative to the second portion 918 of the communication cable 916 such that all points along a length of both the first and second portions 920, 918 of the communication cable 916 are shielded by at least one of the first or second set of shielding portions 932a-c, 934a-c. That is, at any point along the length of the communication cable 916, at least one shielding portion 936, 938 is disposed between the first and second portions 920, 918 of the communication cable 916. In this way, when the first and second portions 920, 918 of the communication cable 916 are positioned as shown in FIG. 9A, the first and second portions 920, 918 can be completely shielded from one another.

Alternatively, as shown in FIG. 9B, when the first portion 920 is shifted relative to the second portion 918, the discrete shielding portions of the first and second electric shields 932, 934 are arranged such that gaps 940 form within the variable shield to expose the first portion 920 of the communication cable 916 to the second portion 918 of the communication cable 916. The gap 940 can have an exposure dimension indicated at 942. As shown in FIG. 9C, the first portion 920 of the communication cable 916 can be further shifted relative of the second portion 918 of the communication cable 916 to increase the exposure dimension 942 of the gaps 940 in the variable shield.

In at least one example, as the exposure dimension 942 increases and decreases with the shifting positions of the first and second portions 920, 918 of the communication cable, more or less area or length of the first and second portions 920, 918 are exposed such that the self-interference between the first and second portions 920, 918 increases and decreases due to the varying parasitic capacitance and self-inductance of the communication cable 916. Accordingly, the relative position of the first portion 920 and second portion 918 of the communication cable affects the BER of data transmitted through the communication cable 916. The communication cable 916 can be electrically connected to a processor, which is connected to a memory component storing electronic instructions that, when executed by the processor, cause the processor to send data through the data transfer communication cable 916 and determine if the first portion 920 is in the first position or the second position relative to the second portion 918, as shown in FIGS. 9A and 9B, respectively, based on the BER. The variable shielding of the data transfer communication cable 916 can magnify the differences in BER from one position to another, corresponding to total shielding and minimal shielding, to provide a wider range of BER associated with smaller shifts in positions of the cable 916.

Any of the features, components, and/or parts, including the arrangements and configurations thereof shown in FIGS. 9A-9C can be included, either alone or in any combination, in any of the other examples of devices, features, components, and parts shown in the other figures. Likewise, any of the features, components, and/or parts, including the arrangements and configurations thereof shown in the other figures can be included, either alone or in any combination, in the example of the devices, features, components, and parts shown in FIGS. 9A-9C.

One or more other examples can include variable electrical shielding components different than that shown in FIGS. 9A-9C but which vary the degree of electrical shielding between two or more portions of a communication cable as the positions of various portions of that cable vary. In this way, the communication cable can be used to determine a position of a joint or multiple portions of an electronic device secured at the joint based on the measured BER through the cable without the need for any additional position sensor component or extra data paths other than the communication cable itself. Furthermore, the measurement of the BER is data agnostic. In other words, any type of data that is transmitted through the communication cable can be used to determine the BER, and the data, including user data, does not need to be stored by the system.

In some examples, the present system can collect and/or use personal information data that uniquely identifies or can be used to contact or locate a specific person. Such personal information data can be used to the benefit of users in the present exemplary systems and methods, such as by delivering targeted content, or adapting the system to fit the user's habits or needs. If personal information data is used, however, it should be used in a manner that is consistent with well-established privacy policies and/or privacy practices that are generally recognized as meeting or exceeding industry or governmental requirements for maintaining personal information data private and secure. Furthermore the policies and procedures used in connection with the present systems and methods should minimize risks of unintentional or unauthorized access or use.

The foregoing description, used specific nomenclature to provide a thorough understanding of the described embodiments. However, it the specific details are not required in order to practice the described examples and are presented for purposes of illustration and description. The specific details are not intended to be exhaustive or to limit the embodiments to the precise forms disclosed. Rather, many modifications and variations are possible in view of the above teachings.

What is claimed is:

1. An electronic device, comprising:
   a first portion;
   a joint;
   a second portion adjustably connected to the first portion at the joint;
   a data cable forming a clock spring at the joint and extending from the first portion to the second portion through the joint;
   a processor electrically connected to the cable; and
   a memory component storing electronic instructions that, when executed by the processor, configure the electronic device to:
   transmit data through the cable; and
   determine a position of the first portion relative to the second portion based on a bit error rate.

2. The electronic device of claim 1, wherein:
   the first portion includes a display;
   the second portion includes an input mechanism; and
   the cable is configured to transmit data from the input mechanism to the display.

3. The electronic device of claim 2, wherein:
   the display is positioned at an angle relative to the input mechanism; and
   the processor determines a magnitude of the angle based on the bit error rate.

4. The electronic device of claim 2, wherein the input mechanism includes a keyboard or a touchpad.

5. The electronic device of claim 1, wherein the cable includes a flat flexible cable.

6. The electronic device of claim 5, wherein the cable includes a first arm, and a second arm connected to the first arm at a bend portion.

7. A position sensor, comprising:
   a data transfer cable including:
   a bend;
   a first portion extending a first variable length from the bend, the first portion including a first sliding contact; and
   a second portion coupled to the first portion at the bend and variably positioned adjacent the first portion, the second portion extending a second variable length from the bend and including a second sliding contact abutting the first sliding contact;
   a processor electrically connected to the data transfer cable; and
   a memory component storing electronic instructions that, when executed by the processor, cause the processor to:
   transfer data through the data transfer cable;
   measure a bit error rate of the data by comparing the transferred data with data received from the transfer cable; and
   determine a position of the first portion of the data transfer cable relative to the second portion of the data transfer cable by correlating the bit error rate to the position.

8. The position sensor of claim 7, wherein the first portion is electrically unshielded from the second portion.

9. The position sensor of claim 7, wherein the data transfer cable forms a clock spring.

10. The position sensor of claim 9, wherein the clock spring comprises:
    a first coil including the first portion; and a second coil including the second portion adjacent the first portion.

11. The position sensor of claim 10, wherein a distance between the first portion and the second portion is variable.

12. The position sensor of claim 7, wherein the first portion is positioned relative to the second portion to define an overlap length equal to a shorter length of the first variable length and the second variable length.

13. The position sensor of claim 12, wherein the first variable length and the second variable length are variable to change a position of the second portion relative to the first portion.

14. A position sensor, comprising:
a data transfer cable including:
  a first portion;
  a second portion connected to the first portion; and
  a variable shield disposed between the first portion and the second portion, wherein:
    the variable shield electrically shields the first portion from the second portion to a first degree when the first portion is in a first position relative to the second portion;
    the variable shield electrically shields the first portion from the second portion to a second degree different than the first degree when the first portion is in a second position relative to the second portion; and
    the first position is calculated based on the first degree and the second position is calculated based on the second degree.

15. The position sensor of claim 14, further comprising a processor electrically connected to the data transfer cable and a memory storing electronic instructions that, when executed by the processor, cause the processor to:
  send data through the data transfer cable, the data having a bit error rate; and
  determine if the first portion is in the first position or the second position relative to the second portion based on the bit error rate.

16. The position sensor of claim 15, wherein the first degree of electrical shielding and the second degree of electrical shielding affects the bit error rate.

17. The position sensor of claim 14, wherein the data transfer cable forms a clock spring including:
  a first coil including the first portion; and
  a second coil including the second portion adjacent the first portion.

18. The position sensor of claim 14, wherein the variable shield defines intermittent gaps exposing the first portion or the second portion.

* * * * *